United States Patent [19]

Yonemoto

[11] Patent Number: 4,635,958
[45] Date of Patent: Jan. 13, 1987

[54] AUTOMOBILE SUSPENSIONS
[75] Inventor: Kenji Yonemoto, Toyota, Japan
[73] Assignee: Toyota Jidosha Kabushiki Kaisha, Japan
[21] Appl. No.: 755,442
[22] Filed: Jul. 16, 1985
[30] Foreign Application Priority Data Jul. 18, 1984 [JP] Japan .................... 59-10942[U]

[51] Int. Cl.[4] ............................................. B60G 11/18
[52] U.S. Cl. ................................. 280/664; 267/57; 267/154; 280/695; 280/700; 280/721
[58] Field of Search ............... 280/664, 695, 700, 721; 267/57, 154

[56] References Cited

U.S. PATENT DOCUMENTS

| | | | |
|---|---|---|---|
| 2,606,758 | 8/1952 | Collier | 267/57 |
| 2,858,142 | 10/1958 | Schjolin et al. | 280/721 |
| 2,972,489 | 2/1961 | Collier et al. | 280/721 |
| 3,027,177 | 3/1962 | Karlstad, Jr. | 280/695 |
| 3,178,200 | 4/1965 | Backaitis et al. | 280/664 |
| 3,815,685 | 6/1974 | Seifert, Jr. | 267/154 |
| 3,831,969 | 8/1974 | Grosseau | 280/702 |

FOREIGN PATENT DOCUMENTS 133383 10/1951 Sweden .................. 280/695

OTHER PUBLICATIONS

Japanese Utility Model Appln. laid open Nos. Showa 59-94910, 59-125403.

Primary Examiner—John J. Love
Assistant Examiner—Kenneth R. Rice
Attorney, Agent, or Firm—Parkhurst & Oliff

[57] ABSTRACT

This invention relates to an automobile suspension of a vehicle, which can suspend two wheels located on the sides of the vehicle. The automobile suspension includes a pair of torsion bars extending in the longitudinal direction of the vehicle, a pair of brackets projecting inwardly from a pair of body side members of the vehicle and a pair of rear arms mounted on the pair of brackets. Each rear arm is mounted on an end of each torsion bar. Each bracket includes at least two vertical walls having an interval defined therebetween and each vertical wall has an upper recess thereon. The upper recess of each vertical wall is aligned with the uper recess of another vertical wall. A protrusion is projected upwardly from the bracket and the protrusion is located between the two vertical walls. Each rear arm includes at least two vertical plates and a cylinder. The two vertical plates define a space therebetween, and the cylinder penetrates the two vertical plates. The space defined between the two vertical plates is shorter than the interval defined between the two vertical walls of the bracket. A bottom recess is defined between the two vertical plates and the cylinder, and both ends of the cylinder project outwardly from the two vertical plates. The ends of the cylinder are rotatably mounted on the upper recesses of the bracket. In assembled condition, the protrusion is located within the bottom recess of the rear arm, so that the rear arm is positioned at the predetermined position in the longitudinal direction of a vehicle.

13 Claims, 7 Drawing Figures

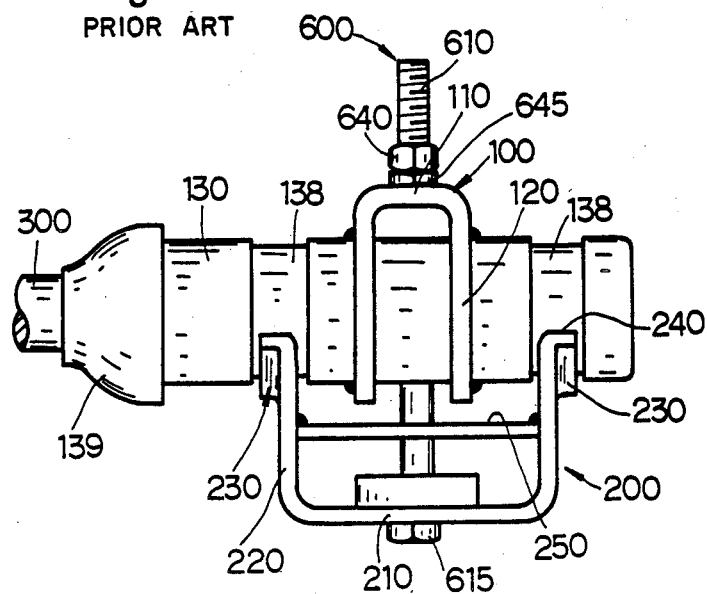
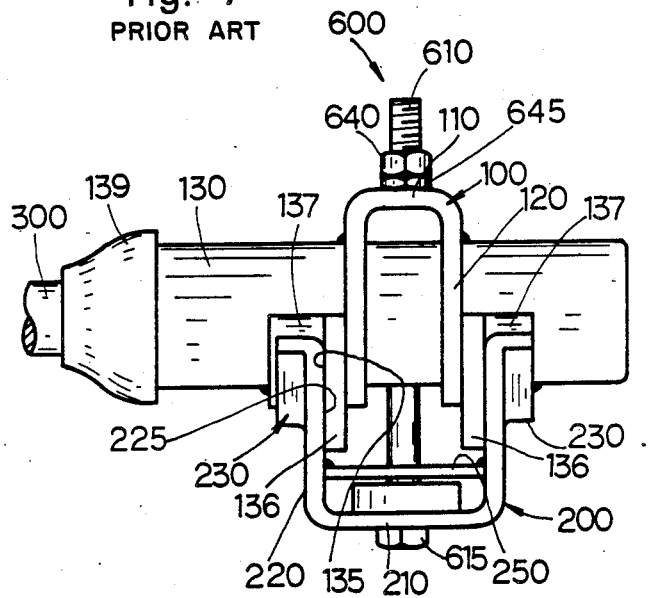

AUTOMOBILE SUSPENSIONS

BACKGROUND OF THE INVENTION

The present invention relates to the suspension of a group of wheels provided with an assembly tie-rod. More particularly, the invention relates to an improvement for positioning a rear arm connected to an end of a torsion bar of the suspension at a predetermined position in the longitudinal direction of a vehicle by a positioning means. The positioning means obviates the installation problems encountered with known devices.

A conventional automobile suspension is disclosed in U.S. Pat. No. 3,831,966. This patent discloses an automobile suspension which includes a forward suspension arm, a torsion bar and a rear arm therein. The torsion bar is mounted rotatably on a body side member through a bearing and includes an end connected to the forward suspension arm and another end connected to the rear arm. The rear arm is mounted on a leaf spring and is fixed on the leaf spring by a tie-rod. A swell of the rear arm is positioned between projections of a complementary part held on the leaf spring, so that any relative movement exerted parallel to the axis of the torsion bar is prevented by the projections of the complementary part.

This conventional automobile suspension requires many components i.e. the complementary part, the leaf spring and the tie-rod, and requires a substantial amount of time and effort for assembly. The assembly is difficult because the rear arm must be fixed by the tie-rod after the complementary part is positioned and held on the leaf spring by the tie-rod.

FIG. 6 shows components arranged around a rear arm 100 of a second Prior Art conventional automobile suspension. This suspension includes a bracket 200 projecting from the inside of a body side member in the lateral direction of a vehicle, a rear arm 100 fitted on the end of a torsion bar 300 and a tie-rod 600 securing the rear arm 100 to the bracket 200. The rear arm 100 includes a pair of vertical plates 120 and a cylinder 130 welded on the vertical plates 120. The cylinder 130 has a pair of outer peripheral recesses 138 on the outside portions thereof, and the bracket 200 includes a pair of vertical portions 220. Each vertical portion 220 of the bracket 200 includes an upper portion 240, and the upper portion 240 of the bracket 200 has a cylindrical upper recess 230. When assembled, the pair of upper portions 240 of the bracket 200 are positioned within the pair of outer peripheral recesses 138 on the cylinder 130 of the rear arm 100.

The rear arm 100 of this automobile suspension is not movable in the axial direction of the torsion bar 300 because the engagement between the pair of outer peripheral recesses 138 formed on the cylinder 130 of the rear arm 100 and the pair of upper portions 240 of the bracket 200 prevents this movement. The pair of outer peripheral recesses 138 required on the cylinder 130 of this conventional suspension reduces the durability of the cylinder 130 of the rear arm 100.

FIG. 7 shows components arranged around a rear arm 100 of another conventional automobile suspension. This automobile suspension includes similar components to the previous automobile suspension. The difference between these automobile suspensions is that this automobile suspension has a pair of stop members 137 on the cylinder 130 instead of the outer peripheral recesses 138 of the previous automobile suspension. Each stop member 137 includes a lateral flange 136 projecting outwardly from the cylinder 130, and an outer surface 135 of the stop member 137 is in contact with an inner surface 225 of the vertical portion 220 of the bracket 200.

Therefore, the rear arm 100 of this automobile suspension is stopped in its movement in the axial direction of the torsion bar 300 by the contact between the pair of outer surfaces 135 of the stop members 137 and the pair of inner surfaces 225 of the bracket 200.

However, this conventional automobile suspension necessiates the pair of stop members 137, and as a result, extra weight is added to the rear arm 100 of the automobile suspension.

SUMMARY OF THE INVENTION

The present invention was developed in view of the foregoing background and to overcome the foregoing drawbacks. It is accordingly an object of this invention to provide an automobile suspensions which can be mounted easily on a body member of a vehicle.

To achieve easy mounting of the automobile suspension, a bracket having a protrusion and a rear arm having a bottom recess are provided for positioning the rear arm at a predetermined location in the longitudinal direction of a vehicle The bracket projecting from a body member in the lateral direction of the vehicle includes at least two vertical portions having an interval defined therebetween, and each vertical portion has an upper recess. An upward protrusion is located between the two vertical portions and is aligned with the upper recesses.

The rear arm includes at least two vertical plates having a space defined therebetween and a cylinder penetrating and being perpendicular to the two vertical plates. The space defined between the two vertical plates is shorter than the interval defined between the at least two vertical portions of the bracket. The cylinder projects out from both sides of the two vertical plates. A bottom recess is defined between the two vertical plates and the bottom of the cylinder. In mounting condition, the cylinder, which projects out from the sides of the plates, is mounted on the upper recesses formed on the two vertical portions of the bracket, and the protrusion is positioned within the bottom recess defined between the two vertical plates of the rear arm. As a result, when the rear arm is mounted on an end of a torsion bar of the automobile suspension it is prevented from moving in the longitudinal direction of the vehicle, so that the automobile suspension can be mounted easily on the body member. This provides for increased productivity and decreased production costs. Thus, this invention is a significant contribution to the industry.

BRIEF DESCRIPTION OF THE DRAWINGS

The above object, features and advantages of the present invention will become more apparent from the description of the invention which follows, taken in conjunction with the accompanying drawings, wherein like reference numerals denote like elements:

FIG. 6 is an enlarged side view of components around an end of a torsion bar of a prior art conventional automobile suspension in assembled condition; and FIG. 7 is an enlarged side view of components around an end of a torsion bar of another prior art conventional automobile suspension in assembled condition.

DETAILED DESCRIPTION OF THE PREFERRED EMBODIMENT

The present invention will be described in detail with reference to the accompanying drawings which illustrate a preferred embodiment according to the present invention.

Figure 1:
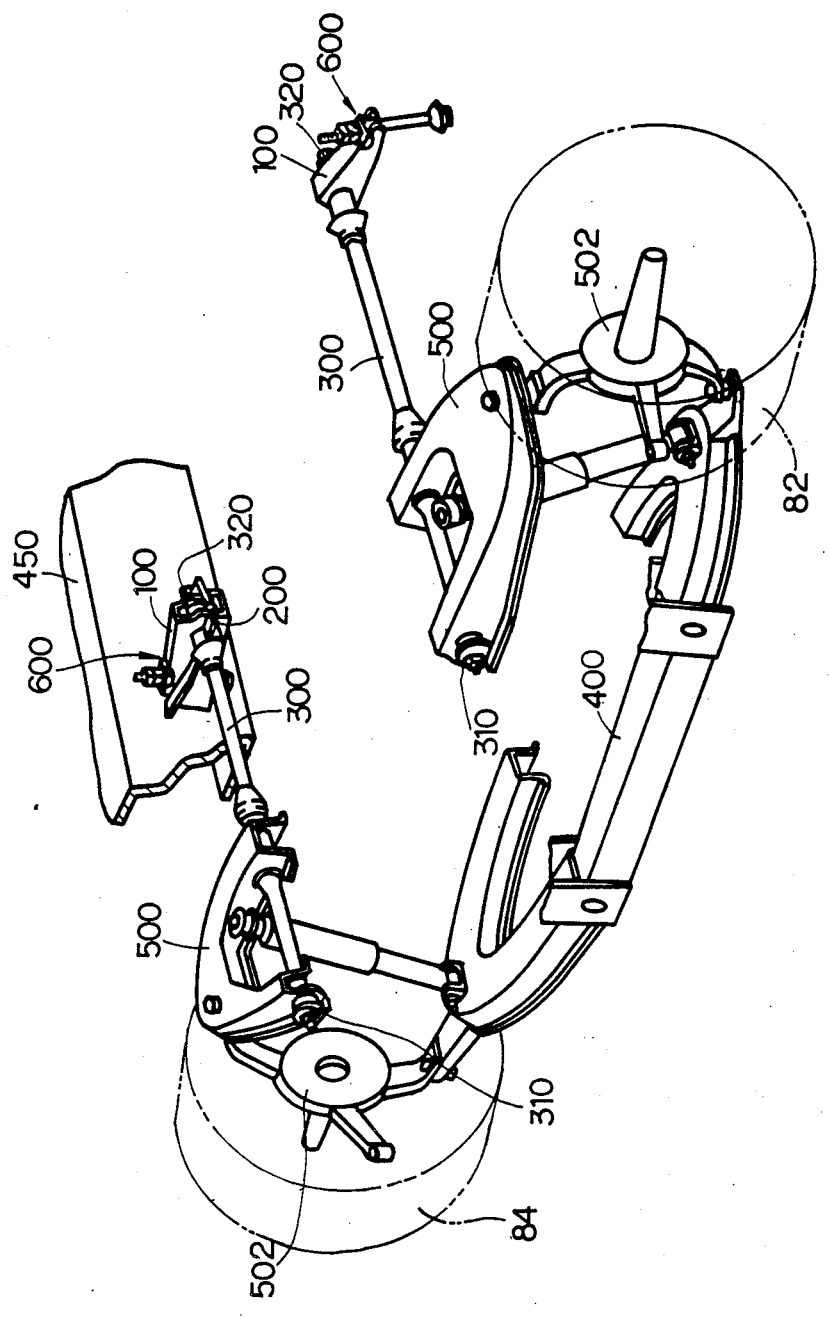
FIG. 1 is a partial, perspective view of an automobile suspension according to the present invention mounted on a body member of a vehicle, as viewed from the front side of the vehicle.
Figure 2:
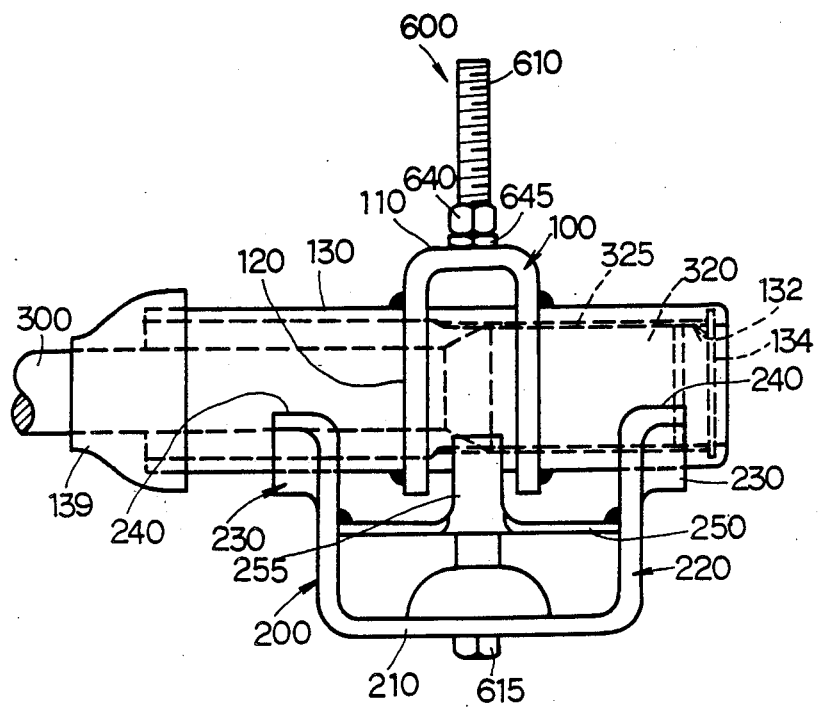
FIG. 2 is an enlarged side view of components around an end of a torsion bar of the automobile suspension in an assembled condition, as viewed from the inside of the vehicle.
Figure 3:
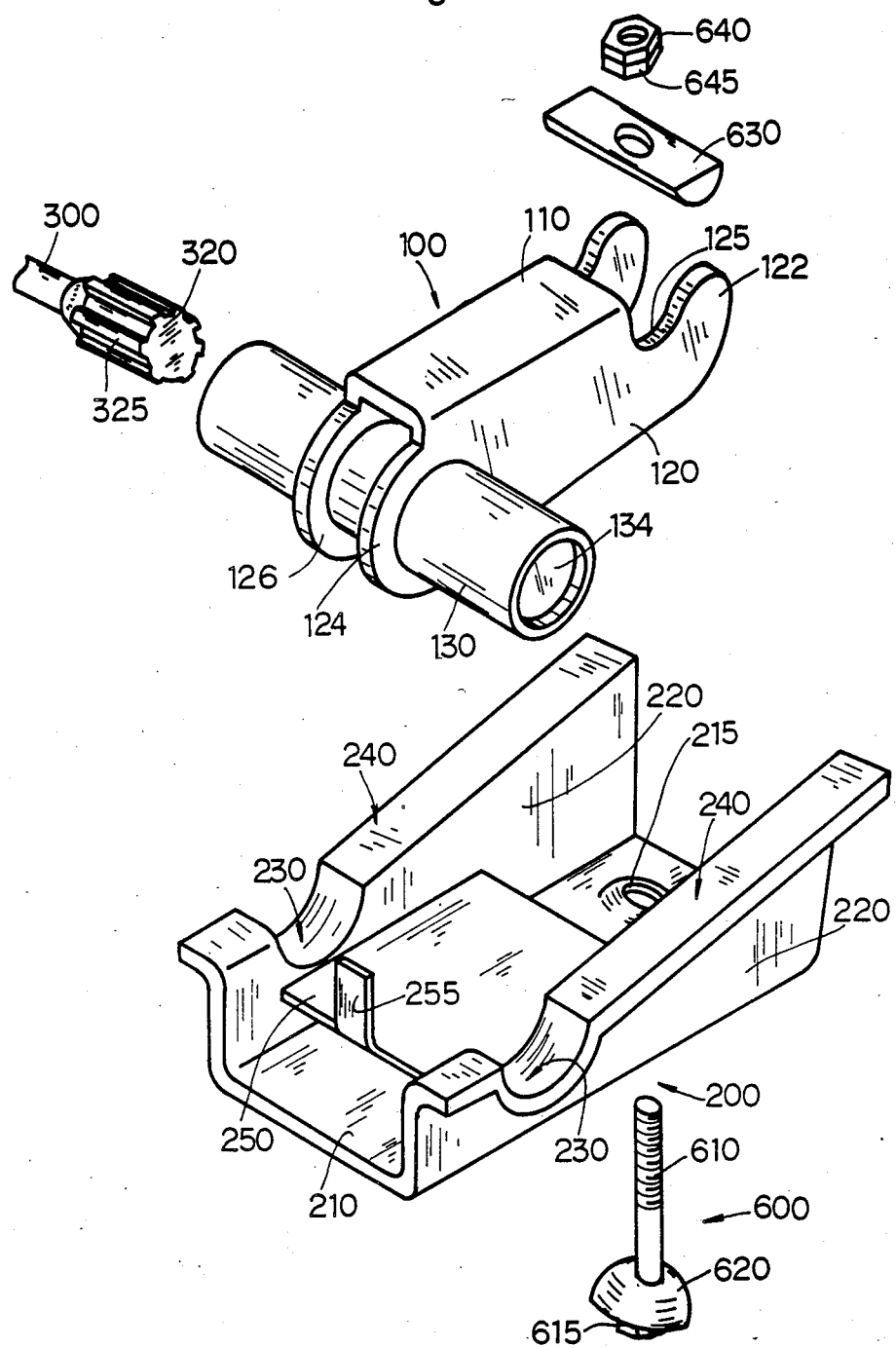
FIG. 3 is an enlarged perspective view of the components shown in FIG. 2 in a disassembled condition.

Referring to FIG. 1, in an automobile suspension for suspending front wheels 82 and 84 on a body structure 400 of a vehicle, a pair of front suspension arms 500 are connected to the wheels 82 and 84 by wheel suspending members 502 and each front suspension arm 500 is mounted on an end 310 of a torsion bar 300. The end 310 of a torsion bar 300 is embedded in the front suspension arm 500 and the other end 320 is embedded in a rear arm 100. A bracket 200 extends inwardly in a lateral direction (e.g., in a side to side direction) of the vehicle from the body side member 450 and is substantially perpendicular to the body side member 450. As shown in FIGS. 2 and 3, the bracket 200 includes a horizontal wall 210 and two vertical walls 220 which extend upwardly from both sides of the horizontal wall 210. An interval is defined between the two vertical walls 220. A reinforcement member 250 is bridged between the two vertical walls 220 and the reinforcement member 250 welded into the two vertical walls 220. Each vertical wall 220 has an upper flange 240 and the cylindrical upper recess 230, and the cylindrical upper recesses 230 of the vertical walls 220 are aligned in the longitudinal direction of the vehicle. The reinforcement member 250 includes an upward projection 255, which is aligned with the two cylindrical upper recesses 230 of the bracket 200.

Figure 5:
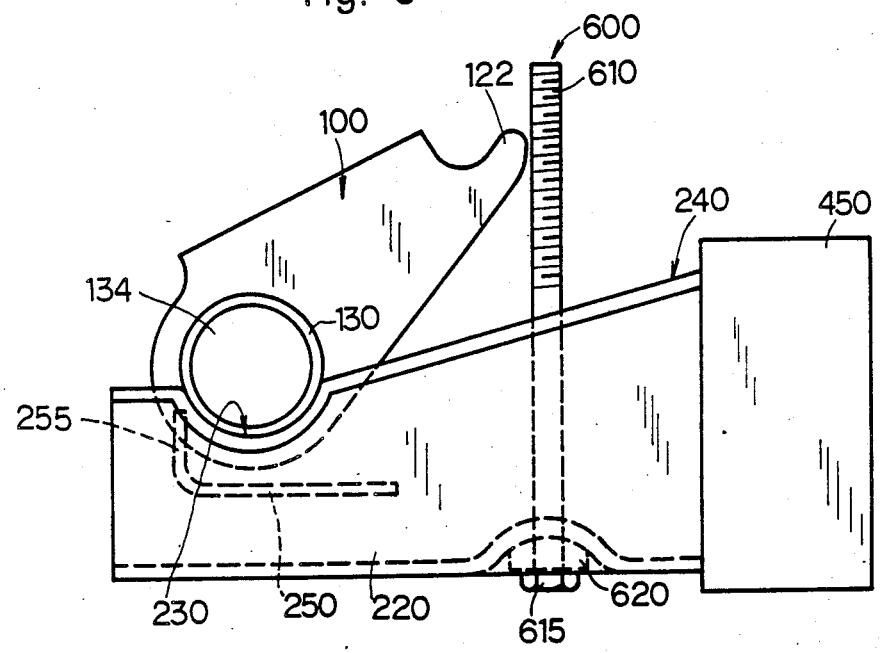
FIG. 5 is an enlarged rear view of components shown in FIG. 4, shown in a disassembled condition in which a rear arm is mounted on a bracket.

The rear arm 100 includes a horizontal plate 110 and two vertical plates 120 extending downwardly from both sides of the horizontal plate 110. A space is defined between the two vertical plates 120, the space being shorter than the interval defined between the two vertical walls 220 of the bracket 200, so that the two plates 120 will fit between the walls 220. A cylinder 130 penetrates inner portions 124 of the two vertical plates 120 and the cylinder 130 is welded to the two vertical plates 120. A bottom recess 126 is defined between the two vertical plates 120 and the cylinder 130, and the bottom recess 126 is defined around a bottom surface and an inner side surface of the cylinder 130. The upward projection 255 is aligned with the upper recesses 230, so that the wall of the upper projection 255, which is closest to the cylinder 130 when assembled, is aligned with the edges of upper recesses 230 in the longitudinal direction of the vehicle which is of the direction parellel to the length of the body side member 450. A plurality of grooves 132 are formed on an inner peripheral surface of the cylinder 130 and a shield 134 for sealing between an inside and an outside of the cylinder 130 is fitted in the vicinity of an end of the cylinder 130. The end 320 of the torsion bar 300 has a plurality of projections 325 which are formed so as to engage with the plurality of grooves 132 as shown in FIG. 2. However, the torsion bar 300 is not restricted in movement in the axial direction of the torsion bar 300, so that the cylinder 130 is movable on the end 320 of the torsion bar 300. A cover member 139 covers the other end of the cylinder 130 and a portion of the torsion bar 300 and seals the inside of the cylinder 130 from the outside of the cylinder 130. Each vertical plate 120 of the rear arm 100 has a top recess 125 at an outer portion 122 thereof. When both end portions mounted on the cylindrical upper recesses 230 of the bracket 200, the two vertical plates 120 of the rear arm 100 are located within the interval defined between the two vertical walls 220 of the bracket 200. The upward projection 255 is inserted into the bottom recess 126 defined between the vertical plates 120, even if the rear arm 100 is not secured to the bracket 200 by a tie-rod 600 as shown in FIG. 5. As a result, the protrusion 255 positions the rear arm 100 at the predetermined position in the longitudinal direction of the vehicle, and the upward projection 255 permits the rear arm 100 to move within the space defined between the two vertical plates 120 in the longitudinal direction of the vehicle.

Figure 4:
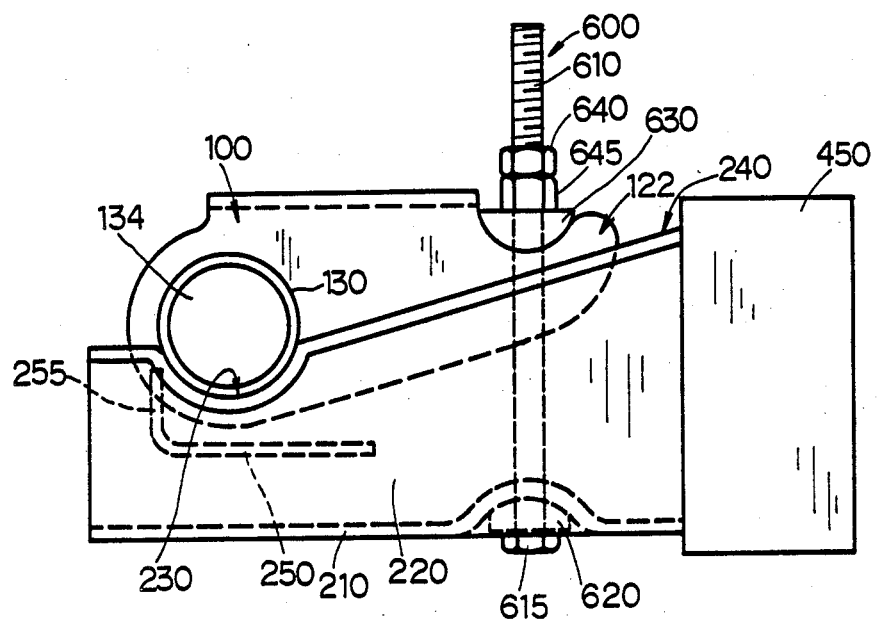
FIG. 4 is an enlarged rear view of components shown in FIG. 2, as viewed from the rear of the vehicle.

As shown in FIG. 4, the rear arm 100 is rotated on the cylindrical upper recesses 230, and the rear arm 100 rotates the other end 320 of the torsion bar 300. As a result, a bias force is caused on the torsion bar 300 by the rotation of the rear arm 100. The tie-rod 600 includes a bolt 610 having a head portion 615, a lower swell 620, an upper swell 630, a nut 645 and a counter nut 640. The bolt 610 is inserted into an aperture of the lower swell 620, a hole 215 of the bracket 200 and an opening of the upper swell 630, and a threaded end of the bolt 610 is engaged with the nut 645 and the counter nut 640. The bias force caused on the torsion bar 300 can be adjusted by the nut 645 and the counter nut 640 because the upper swell 630 is mounted on the top recesses 125 of the rear arm 100 in an assembled condition. The bias force is increased when the upper swell 630 is moved downwardly.

Therefore, in the automobile suspension according to the present invention, when the rear arm 100 is not mounted on the bracket 200, the rear arm 100 can move along the torsion arm 300 of the automobile suspension in the longitudinal direction of the vehicle. The rear arm 100 can be easily positioned at predetermined position in the longitudinal direction of the vehicle, when the rear arm 100 is mounted on the bracket 200. This is because the upward projection 255 is substantially aligned with the two cylindrical recesses 230 of the bracket 200, so that the upward projection 255 is easily inserted the bottom recess 126 of the rear arm 100. Accordingly, the rear arm 100 can be easily adjusted its position, when the bolt 610 of the tip-rod 600 is inserted into the opening of the upper swell 630.

Because the space allows the rear arm 100 to move in the longitudinal direction of the vehicle, it is easy to assemble the rear arm 100 on the bracket 200 by the tie-rod 600. The upward projection 255 allows the rear arm 100 to be positioned at the predetermined position in the longitudinal direction of the vehicle. The upward projection 255 always stays within the bottom recess 126, even when the rear arm 100 is rotated, because the bottom recess 126 is defined between the two vertical plates 120 and the inner and bottom surfaces of the cylinder 130.

As described herein, the present invention overcomes the shortcomings of the known art by providing a means for positioning a rear arm mounted on a torsion bar of an automobile suspension at the right position in the longitudinal direction of a vehicle.

While the present invention has been described in its preferred embodiment, it is to be understood that the invention is not limited thereto, and may be otherwise embodied within the scope of the following claims.

What is claimed is:

1. An automobile suspension for suspending a wheel on a body member of a vehicle comprising:
    a support means including at least two walls and an upward projection, the two walls extending inwardly from the body member in a lateral direction of the vehicle and having an interval defined therebetween, the projection located between the two walls, each of the two walls having at least one upper recess;
    an arm causing a torsion force on a member connected to the wheel, said arm adapted to be mounted slidably on the member in a longitudinal direction of the member, said arm including at least two plates and a cylinder, said cylinder having a plurality of inner grooves, said member including an engagement device which slidably engages with said plurality of inner grooves, whereby said arm is slidable in the longitudinal direction of said member and is not rotatable about said member, the two plates extending in the lateral direction of the vehicle and having a space defined therebetween, said cylinder penetrating the two plates with both ends of the cylinder projecting outwardly from the two plates, the ends of the cylinder adapted to be mounted on the at least one upper recess of each of the two walls of said support means, the upward projection of said support means adapted to be inserted in a bottom recess which is defined between the two plates and the cylinder, whereby said insertion of said upward projection of said support means in said bottom recess prevents said arm from sliding longitudinally relative to said support means but permits said arm to rotate relative to said support means; and
    a securing means for securing opposite edges of the two plates of said arm to said support means.

2. An automobile suspension of claim 1, further comprising a bottom wall fixed to said support means, the two walls of said support means extending upwardly from the bottom wall, the upward projection also extending upwardly from the bottom wall.

3. The automobile suspension of claim 2, wherein the interval defined between the two walls of said support means is longer than the space defined between the two plates of said arm, whereby the two plates of said arm are located within the interval of said support means.

4. The automobile suspension of claim 2, wherein the upward projection of said support means is substantially aligned with at least one upper recess defined in each of the two walls.

5. The automobile suspension of claim 4, wherein the projection and at least one upper recess in each of the two walls are substantially aligned in longitudinal direction of the vehicle.

6. The automobile suspension of claim 1, wherein the member connected to the wheel is a torsion bar extending in the longitudinal direction of the vehicle.

7. The automobile suspension of claim 6, wherein an end of the torsion bar is inserted into the cylinder of said arm.

8. The automobile suspension of claim 1, wherein the bottom recess of said arm is defined between the two plates and bottom and sides surfaces of the cylinder, whereby the upward projection of said support means is positioned within the bottom recess of said arm and will remain positioned within the recess of said arm even when said arm rotates on the upper recesses of the two walls of said support means.

9. An automobile suspension of claim 2, further comprising at least one top recess being defined within the edges of each of the two plates of said arm.

10. An automobile suspension of claim 9, wherein said securing means has an upper swell mounted on the at least one top recess of each of the two plates of said arm, a bolt secured to the bottom wall of said support means and an adjusting means for adjusting a length of the bolt defined between the bottom wall and the upper swell, whereby the torsion force on the member connected to the wheel caused by a rotation of the arm around the member can be adjusted.

11. An automobile suspension for suspending a wheel on a body member of a vehicle comprising:
    a support means having at least two walls, a bottom wall and a projection, the two walls projecting from the body member in the lateral direction of the vehicle and extending upwardly from the bottom wall, the two walls having an interval defined therebetween, the bottom wall bridging the two walls, the projection being located between the two walls and extending upwardly from the bottom wall, the two walls each having at least one upper recess, the projection being aligned with the at least one upper recess of each of said two walls;
    an arm causing a torsion force on a torsion bar member connected to the wheel, the torsion arm member extending in the longitudinal direction of the vehicle, said arm being slidable on an end of the torsion bar member in the longitudinal direction of the torsion bar member, said arm including at least two plates and a cylinder, said cylinder including a plurality of inner projections, said torsion bar member including an engagement device which slideably engages with said inner projections, whereby said arm is slidable in the longitudinal direction of said torsion bar member and is not rotatable about said torsion bar member, at least one top recess being defined within the edge of each of the two plates of said arm, said cylinder being located at one end of said plate, the two plates extending laterally in the vehicle and having a space defined therebetween, said cylinder penetrating the two plates at the ends thereof, both ends of the cylinder projecting outwardly from the two plates, the ends of the cylinder being mounted on at least one upper recess of each of the two walls of said support means, the projection of said support means being inserted into a bottom recess defined between the two plates and bottom and side surfaces of the cylinder, whereby said insertion of said support means in said bottom recess prevents said arm from sliding relative to said support means but permits said arm to rotate in relation to said support means; and a securing means for securing the two plates of said arm to said support means, the securing means having an upper swell, a bolt and an adjusting means, said upper swell being mounted on said at least one top recess defined within the opposite edge of the two plates of said arm, said upper swell being located at the end opposite the cylinder, the bolt extending from the bottom wall of said support means, the adjusting means adjusting a length of the bolt defined between the bottom wall and the upper swell.

12. An automobile suspension for suspending a wheel on a body member of a vehicle comprising:

a support means having at least two walls and a bottom wall, the two walls projecting from the body member in a lateral direction of the vehicle and extending upwardly from the bottom wall, the two walls having an interval defined therebetween, each of the two walls having at least one upper recess;

an arm causing a torsion force mounted on a member connected to the wheel, said arm including at least two plates and a cylinder, said cylinder including inner grooves, said member including an engagement device which slidably engages with said inner grooves, whereby said arm is slidable in the longitudinal direction of said member and is not rotatable about said member, the two plates extending in the lateral direction of the vehicle and having a space defined therebetween, the cylinder penetrating the two plates, both ends of the cylinder projecting outwardly from the two plates, said both ends of the cylinder mounted on the at least one upper recess of each of the two walls of said support means; and a securing means for securing opposite edges of the two plates of said arm to said support means comprising:

an upward projection projecting from the bottom wall of said support means, the upward projection being located between the two walls of said support means and aligned with the two upper recesses of the two walls;

a bottom recess defined between the two plates and bottom and side surfaces of the cylinder of said arm, the upward projection of said support means being inserted in said bottom recess, whereby said insertion of said upward projection in said bottom recess prevents said arm from sliding longitudinally relative to said support means but permits said arm to rotate relative to said support means.

13. The automobile suspension of claim 12, wherein the upward projection and the two upper recesses are substantially aligned in the longitudinal direction of the vehicle.

* * * * *